J. R. MACDONALD.
SHAFT COUPLING.
APPLICATION FILED DEC. 18, 1918.

1,318,455.

Patented Oct. 14, 1919.

Inventor
James R. Macdonald

By John W. Llavley,
Attorneys

UNITED STATES PATENT OFFICE.

JAMES R. MACDONALD, OF BALTIMORE, MARYLAND, ASSIGNOR OF ONE-EIGHTH TO CHARLES BRADDOCK JONES AND ONE-EIGHTH TO CHARLES WILLING BROWNE, BOTH OF BALTIMORE, MARYLAND.

SHAFT-COUPLING.

1,318,455.  Specification of Letters Patent.  Patented Oct. 14, 1919.

Application filed December 18, 1918. Serial No. 267,326.

*To all whom it may concern:*

Be it known that I, JAMES R. MACDONALD, a subject of the King of Great Britain and Ireland, residing at Baltimore, in the State of Maryland, have invented certain new and useful Improvements in Shaft-Couplings; and I do hereby declare the following to be a full, clear, and exact description of the invention, such as will enable others skilled in the art to which it appertains to make and use the same.

My invention relates to shaft couplings.

One object of my invention is to provide a coupling for joining together the ends of shafts.

Another object of my invention is to provide a coupling for the abutting ends of two lengths of shafting the members of which can be readily separated when said shafts are to be disconnected.

Another object of my invention is to provide for removable shoulders upon the shaft lengths so that the shaft lengths may be drawn together longitudinally and insure that there will be no motion of said shaft lengths relative to each other.

In the drawings:—

Figure 2:
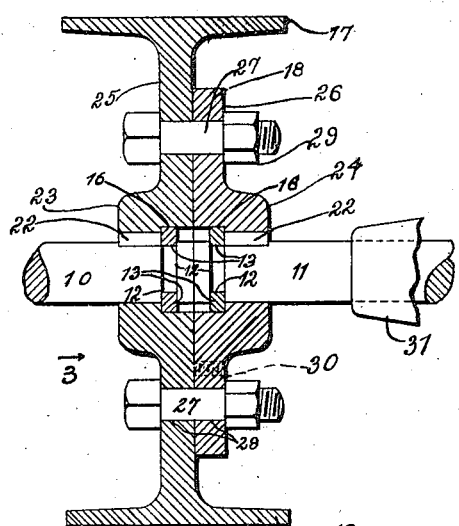
Fig. 2 is a section along the line 2—2 in Fig. 1 looking in the direction of the arrows, and showing the bearing 31.
Figure 1:
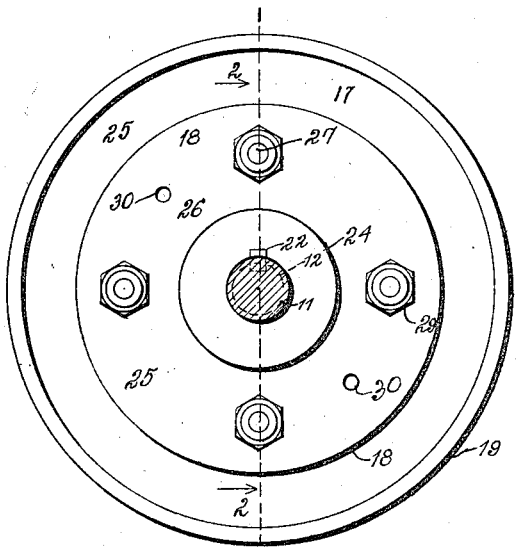
Figure 1 is an end view of my improved coupling, the bearing 31 being omitted.
Figure 3:
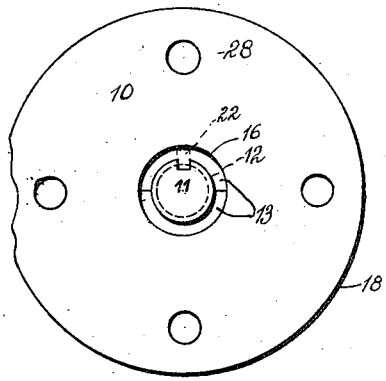
Fig. 3 is a view, looking in the direction of the arrow 3, of the coupling member attached to the right hand shaft, as shown in Fig. 2.

10 and 11 represent the shafts which are to be coupled together. Each of said shafts is provided with a groove 12 in the body thereof for the reception of the two halves 13—13 of the split ring. Each of the halves 13—13 is provided with the inner cylindrical surface 14 which fits the bottom of the groove 12 in the shaft 11. The halves 13—13 of the split ring are also provided with an outer cylindrical surface 15 which fits the counterbores 16—16 formed within the coupling members 17 and 18, the former of which is provided with a cylindrical flange 19 having a smooth outer surface suitable for the application of a brake band thereto or for use as a pulley.

Figure 4:
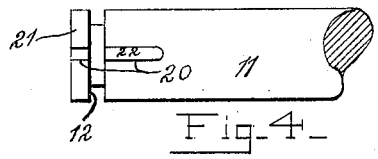
Fig. 4 is a view of the end of one of the shafts prepared for use with my improved coupling.

The shafts 10 and 11 are provided with a keyway such as 20 in Fig. 4; said keyway also extending through the flange 21 on the side of the groove 12.

Splines 22—22 fit tightly within the keyways such as 20 and the hubs 23 and 24 of the coupling members are provided with keyways in which the splines 22—22 fit snugly.

The flanges 25 and 26 of the coupling members are formed integrally with the hubs 23 and 24, respectively, and the cylindrical flange 19 is formed integrally with the flange 25. The bodies of bolts such as 27 pass through holes such as 28 provided in the flanges 25 and 26 and nuts such as 29 serve to secure the members of the coupling together.

In order to provide for readily separating the coupling members, tapped holes 30—30 are provided in the flange 26 for a purpose hereinafter explained.

The manner of use of my improved coupling is as follows:—

Figures 5, 6:
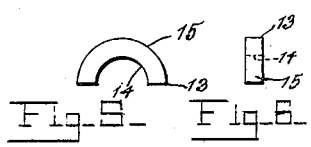
Fig. 5 is an elevation and Fig. 6 a side view of one-half of one of the split rings which are used with my improved coupling.

The splines 22—22 are introduced within the keyways 20 of the shafts 10 and 11, the coupling members 17 and 18 are placed upon the shafts 10 and 11 and moved away from the abutting ends of said shafts until the abutting faces of said members are passed beyond the outward faces of the grooves 12—12. Two of the halves, (see Fig. 5) of the split ring are then introduced within each of the grooves 12—12 and the coupling members are then moved toward each other along the shafts 10 and 11. When the coupling members are moved toward each other, as just described, the counterbores 16—16 embrace the split rings and hold the two halves of each ring together.

The bolts 27 are then to be introduced and the nuts 29 are to be secured in place, thus securing the coupling members 17 and 18 together.

It is evident that the split rings will prevent any longitudinal displacement of the splines 22.

When it is desired to remove, say the shaft 11, the nuts 29 are to be removed from the bolts 27 and two bolts are to be screwed within the threaded holes 30—30 until the ends of said bolts abut against the inner face of the flange 25. Further rotation of said bolts will then cause the flange 26 to separate from said flange 25 sufficiently far for the split rings in the hub 24 to be removed, and then the shaft 11 can be pulled through the bearing 31.

While I have shown the shafts 10 and 11 and the members 17 and 18 as abutting, it is evident that a sheet of insulation may be placed between said shafts and said members for the purpose of insulating the shaft 10 from the shaft 11, and when this is done, suitable insulating bushings are to be placed within the holes such as 28 and suitable insulating washers placed under the nuts 29.

Thus it will be seen that I provide a simple, cheap and effective means for readily separating two coupled shafts. It will also be seen that the outer faces of the rings 13 abut against the bottom of the counterbores 16—16 and when the coupling members 17 and 18 are drawn together as just described, the shafts 10 and 11 are also drawn together.

I claim:—

1. In a shaft coupling, the combination with a pair of shafts, of a coupling member slidably mounted upon each shaft, a groove in each shaft and a ring mounted in each groove, each ring forming an abutting shoulder for a face of the corresponding member.

2. In a shaft coupling, the combination with a pair of shafts, of a coupling member slidably mounted upon each shaft, a groove in each shaft and a split ring mounted in each groove, each ring forming an abutting shoulder for a face of the corresponding member.

3. In a shaft coupling, the combination with a pair of shafts, of a coupling member slidably mounted upon each shaft, a groove in each shaft and a ring mounted in each groove, each ring forming an abutting shoulder for the inner face of the corresponding member.

4. In a shaft coupling, the combination with a pair of shafts, of a coupling member slidably mounted upon each shaft, a groove in each shaft, a split ring mounted in each groove, each ring forming an abutting shoulder for a face of the corresponding member, and a counterbore in each member for the reception of the corresponding ring.

5. In a shaft coupling, the combination with a pair of shafts, of a coupling member slidably mounted upon each shaft, a groove in each shaft, a ring mounted in each groove, each ring forming an abutting shoulder for a face of the corresponding member, and bolts and nuts for securing said members together.

6. In a shaft coupling, the combination with a pair of shafts, of a coupling member slidably mounted upon each shaft, a groove in each shaft, a ring mounted in each groove, each ring forming an abutting shoulder for a face of the corresponding member, bolts and nuts for securing said members together, and threaded holes in one member for the reception of bolts for forcing said members apart.

In testimony whereof I affix my signature.

JAMES R. MACDONALD.

Copies of this patent may be obtained for five cents each, by addressing the "Commissioner of Patents, Washington, D. C."